United States Patent [19]

Hannappel

[11] Patent Number: 4,648,617
[45] Date of Patent: Mar. 10, 1987

[54] CONVERTIBLE LOAD CARRYING APPARATUS FOR ALL TERRAIN VEHICLES

[76] Inventor: Gerald J. Hannappel, 708 W. Solano Dr., Phoenix, Ariz. 85013

[21] Appl. No.: 741,768

[22] Filed: Jun. 6, 1985

Related U.S. Application Data

[63] Continuation-in-part of Ser. No. 520,150, Aug. 4, 1983, Pat. No. 4,522,420.

[51] Int. Cl.⁴ .............................. B62J 7/04; B62J 9/00
[52] U.S. Cl. ............................ 280/289 A; 280/43.2; 280/414.5; 280/456 R; 280/475; 280/476 R
[58] Field of Search ............... 280/204, 289 A, 414.5, 280/415 A, 418, 456 R, 456 A, 460 R, 460 A, 475, 476 R, 476 A, 490 R, 490 A, 43.2, 43.17

[56] References Cited

U.S. PATENT DOCUMENTS

| 2,570,482 | 10/1951 | Pryitt | 280/476 R |
| 3,039,540 | 6/1962 | Ward | 280/460 A |
| 3,131,950 | 5/1964 | Weaver, Jr. et al. | 280/43.2 |
| 3,837,677 | 9/1974 | Haskins | 280/476 R |
| 4,248,451 | 2/1981 | Usinger | 280/490 R |
| 4,431,205 | 2/1984 | Speicher et al. | 280/289 A |

Primary Examiner—John A. Pekar
Assistant Examiner—Kenneth R. Rice
Attorney, Agent, or Firm—Cahill, Sutton & Thomas

[57] ABSTRACT

Structurally integrated apparatus of various configurations is selectively, individually or conjointly detachably attachable to an all terrain vehicle for conveying or carrying various types of cargo and for preventing rearward tilting of the vehicle. Supports extending from the framework of the vehicle are adapted to receive and retain with quick disconnect fittings frame elements of each configuration of the apparatus. The frame elements may be adjustable to accommodate variations in size, shape and weight of the cargo supported by the respective apparatus.

22 Claims, 14 Drawing Figures

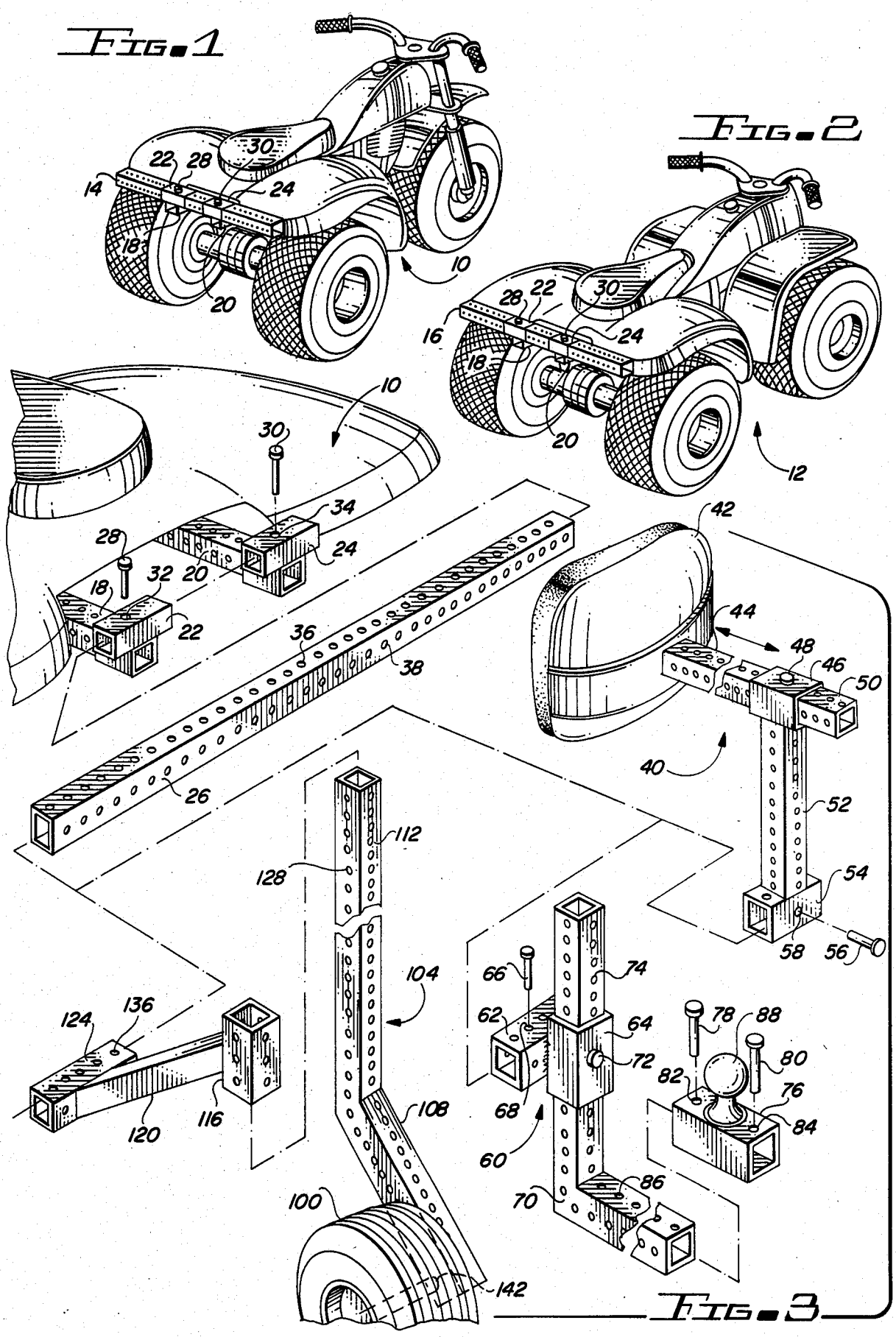

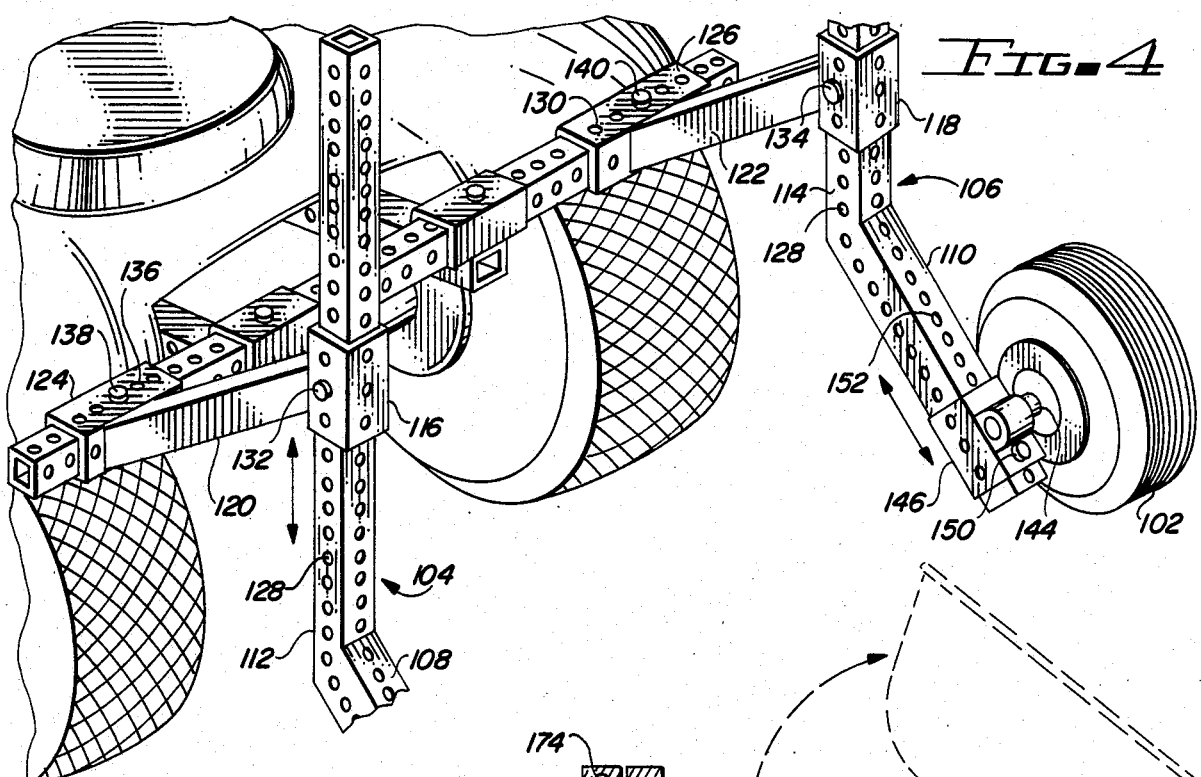
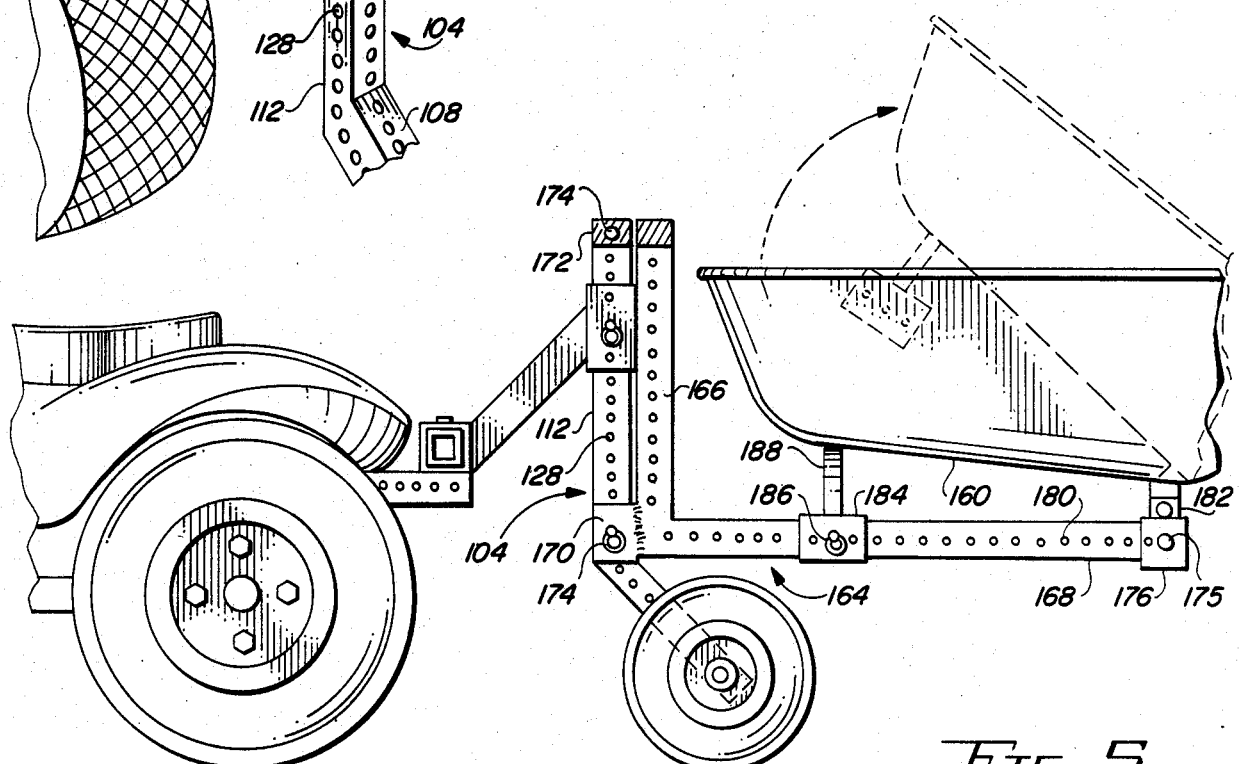
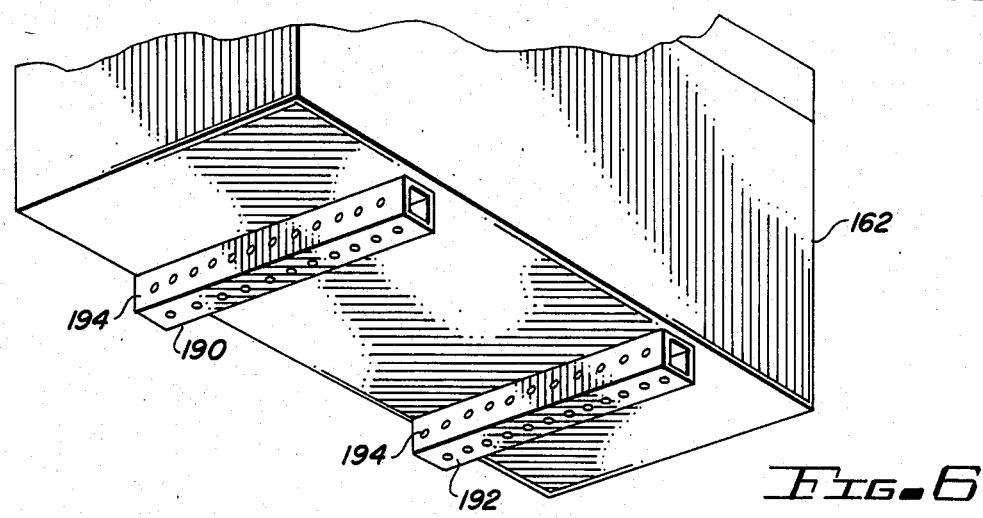

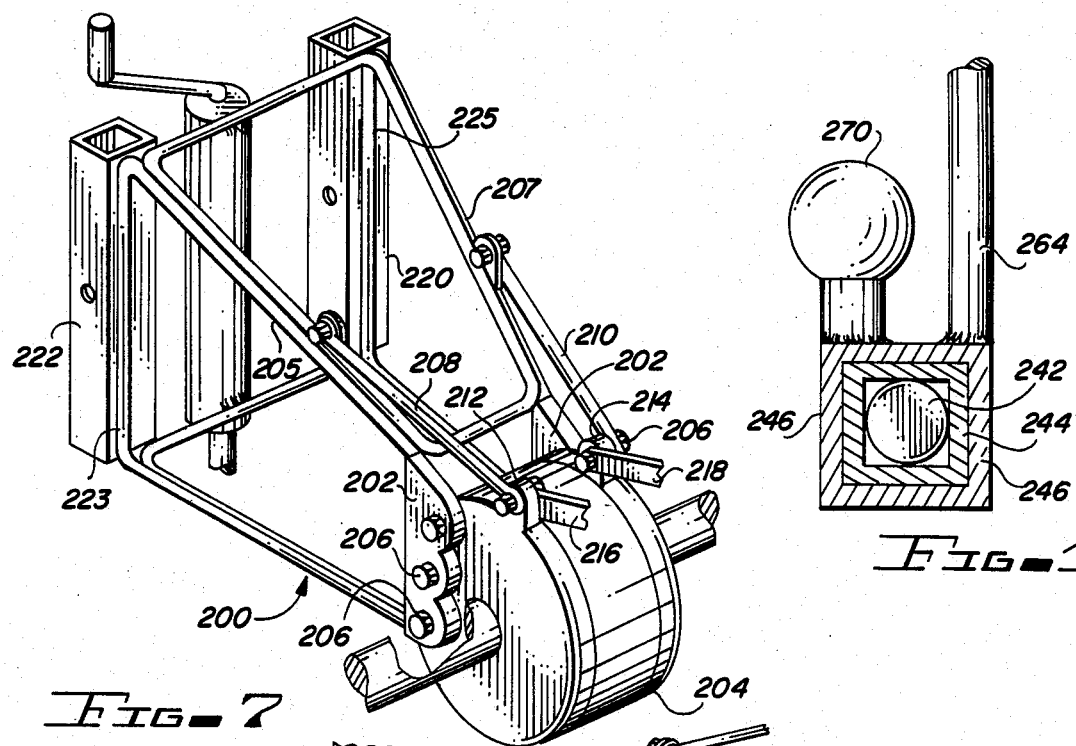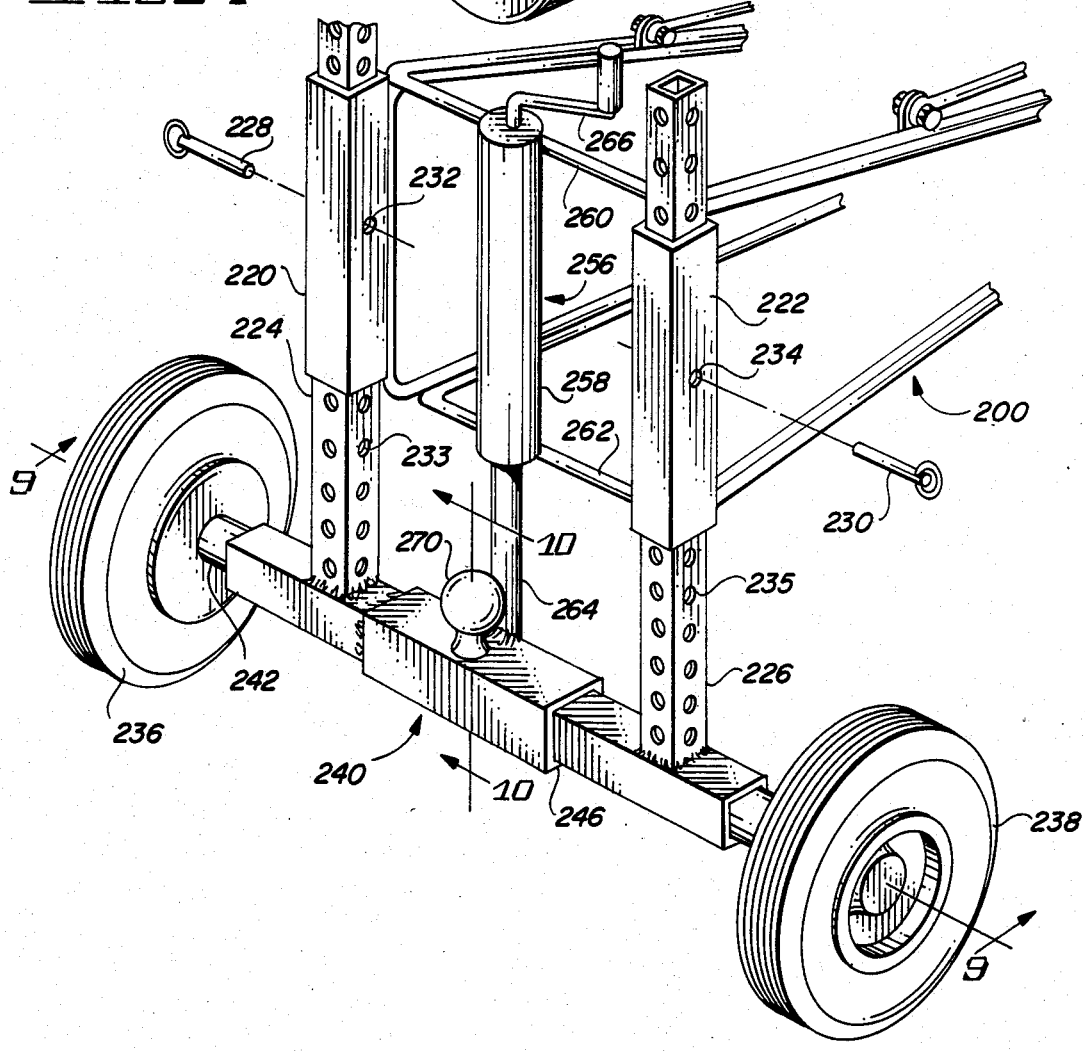

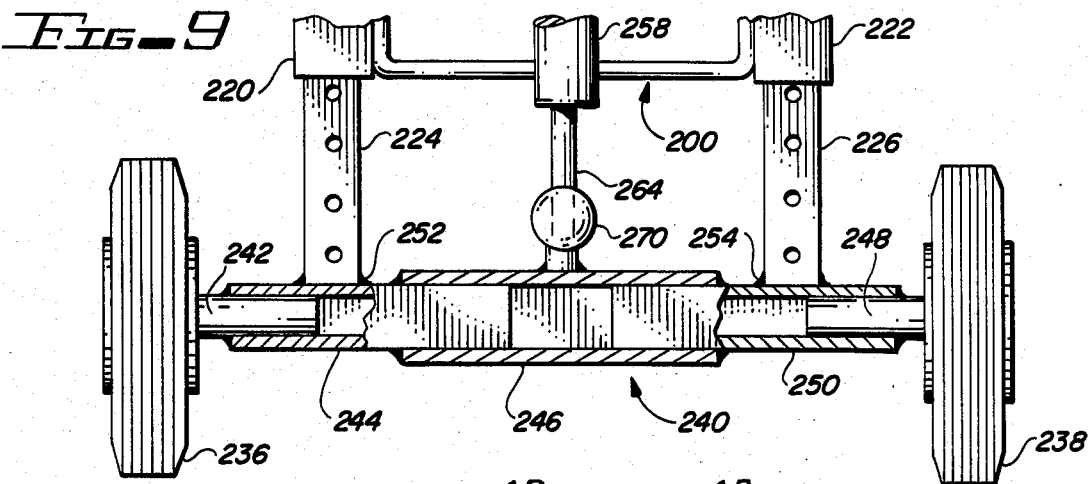
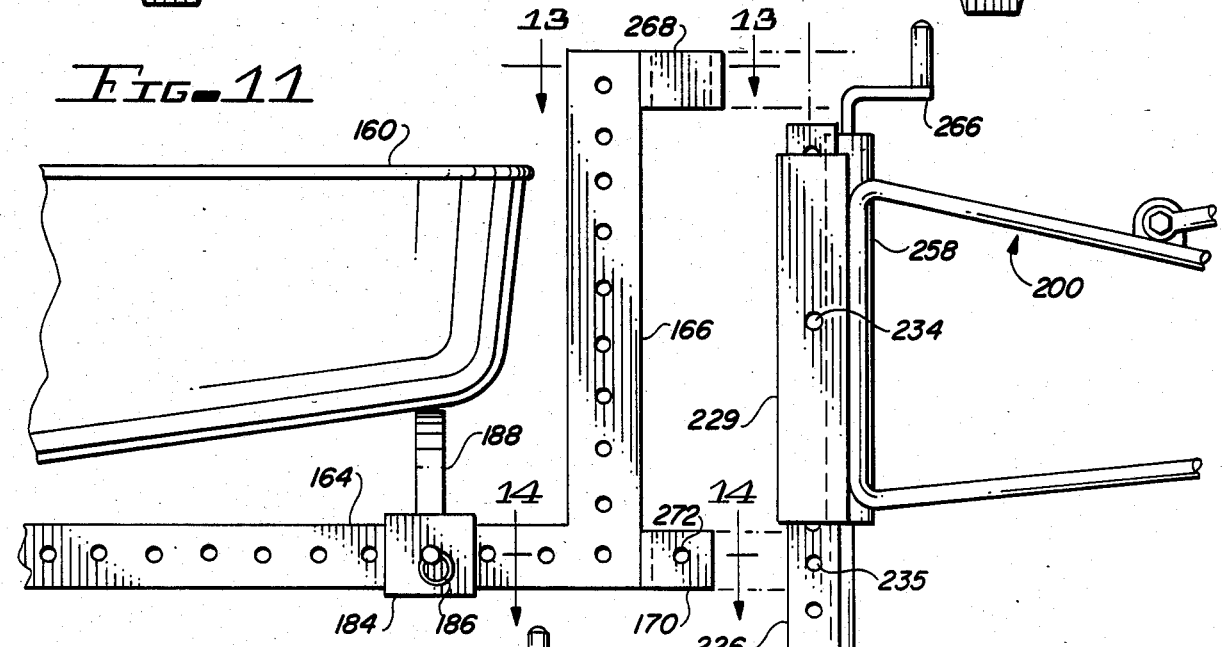
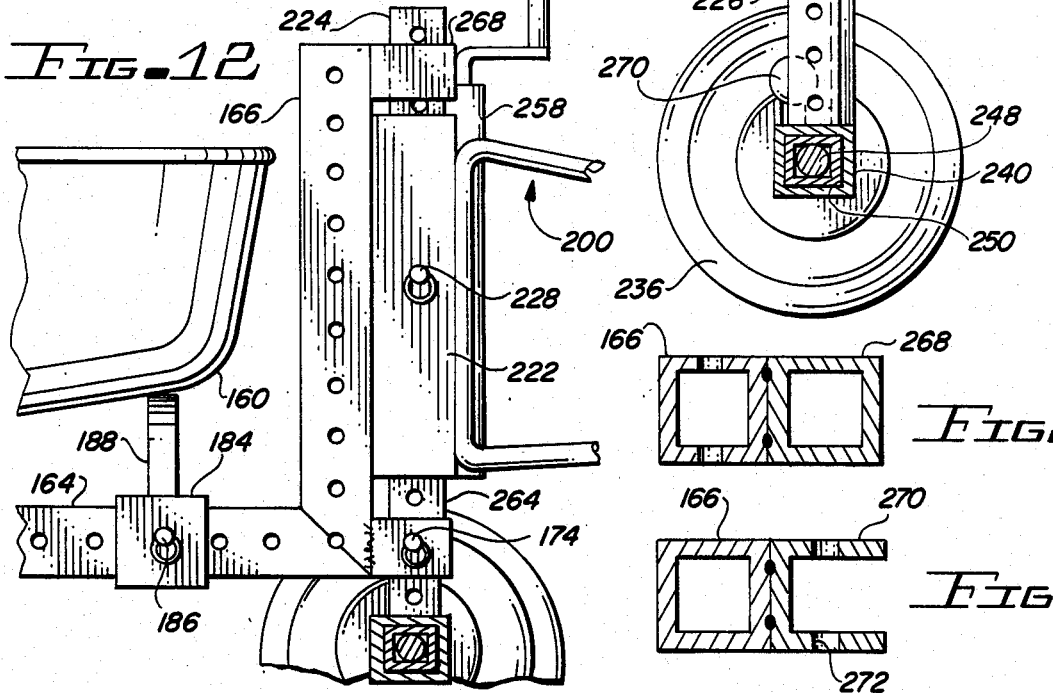
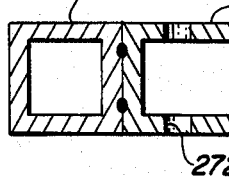

CONVERTIBLE LOAD CARRYING APPARATUS FOR ALL TERRAIN VEHICLES

The present application is a continuation-in-part application of a copending application entitled "ALL TERRAIN VEHICLE CONVERSION SYSTEM", filed on Aug. 4, 1983, assigned Ser. No. 520,150, now U.S. Pat. No. 4,522,420, and describing an invention of the present inventor.

The present invention relates to vehicles and, more particularly, to integrated apparatus interchangeably attachable to an all terrain vehicle for conveying loads of various sizes, shapes and weights.

Three-wheeled vehicles, like that described in the U.S. Pat. No. 4,191,269, are essentially intended for recreational purposes and travel across improved or unimproved ground surfaces. Add-on equipment developed for such three-wheeled vehicles include a frame mounted luggage carrier, as illustrated in U.S. Pat. No. 4,300,706. U.S. Pat. No. 4,182,521 is directed to a three-wheeled vehicle having a cargo box pivotally attached thereto for the purpose of conveying goods to be delivered. The cargo box is restrained from pivoting rearwardly by means of latches extending from the vehicular frame to engage the cargo box and retain it adjacent elements of the vehicular frame. And, U.S. Pat. No. 4,325,562 describes a container specifically adapted to be retained within frame members of a three-wheeled vehicle.

Two-wheeled vehicles are inherently laterally unstable when stopped or moving at a slow speed. Various stabilizing apparatus have been developed to overcome such instability by employing laterally extending side wheels. U.S. Pat. No. 3,700,059 describes a mechanism for raising laterally extending wheels of a two-wheeled vehicle. U.S. Pat. No. 3,811,704 describes a bicycle having a pair of downwardly extendable laterally located wheels for preventing sideways tipping of the bicycle while at rest. U.S. Pat. No. 4,203,500 illustrates outrigger wheels for use with a motorcycle, which outrigger wheels counter-actingly tilt upon tilt of the vehicle to maintain contact with the ground during turns. U.S. Pat. No. 4,326,729 describes a pair of training wheels and brackets therefor for use at the rear wheel of a bicycle. Moreover, two-wheeled vehicles are rearwardly tippable upon substantial rearward top heavy shift of weight or due to protuberances of terrain. Trailing wheeled members have been attached to such two-wheeled vehicles to limit the rearward tipping to a predetermined degree. U.S. Pat. No. 3,284,096 is directed to tilt restraining wheels mounted rearwardly of a bicycle to permit only limited rearward tilting of the bicycle. U.S. Pat. Nos. 3,653,679, 4,012,054 and 4,153,268 are directed to rearwardly extending outriggers for bicycles.

Vehicles having three in line wheels have been adapted by use of wide track wheels and demountably mountable traction belts for travel across ground terrain and snow, as described in U.S. Pat. No. 3,912,031. U.S. Pat. Nos. 2,782,052 and 4,413,761 are directed to attachments for use with boat trailers and vehicle bumpers, respectively.

Each of the above described ancillary equipment for vehicles is intended to serve a single function and little accommodation has been made for rapid and facile attachment and detachment. Moreover, none of the prior art is directed to a composite of equipment for interchangeably selectively adding or substituting equipment for different purposes.

The present invention is directed to an integrated system of equipment for converting a conventional three or four wheeled all terrain vehicle to convey or carry various types of cargo or take in tow various types of trailing wheeled units. This equipment are readily and facilely detachably attachable to common supports extending from the vehicle framework and are adjustable to accommodate various parameters. Conventional three or four wheeled all terrain vehicles have no accommodation for transport of emergency equipment, rations or water; since such vehicles are often driven in inhospitable terrain, a cargo carrier may be detachably attached to the existing supports or in a trailing configuration. Particularly for land travel at high speed or over steep terrain, rearward tilting constitutes a safety hazard. Such tilting may be limited by integratable rearwardly extending auxiliary wheels.

It is therefore a primary object of the present invention to provide structurally integrated equipment selectively individually or conjointly detachably attachable to three or four wheeled all terrain vehicles.

Another object of the present invention is to provide integrated support and frame elements for detachably attaching a variety of equipment to a three or four wheeled all terrain vehicle.

Still another object of the present invention is to provide structurally integrated conversion equipment for interchangeably attaching any of several types of trailing units to a three or four wheeled all terrain vehicle.

Yet another object of the present invention is to provide a structurally integrated support extending from the frame of a three or four wheeled all terrain vehicle for mounting rearwardly located auxiliary wheels.

A further object of the present invention is to provide rapidly detachably attachable support elements for interconnecting various types of equipment with the frame of a three or four wheeled all terrain vehicle.

A still further object of the present invention is to provide rapidly detachably attachable equipment for interconnecting load carrying elements with the frame of a three or four wheeled all terrain vehicle.

A yet further object of the present invention is to provide a pair of structurally integratable auxiliary rear wheels for either preventing rearward tilting of or supporting in part a three or four wheeled all terrain vehicle.

These and other objects of the present invention will become apparent to those skilled in the art as the description thereof proceeds.

The present invention will be described with greater specificity and clarity with reference to the following drawings, in which:

FIGS. 1 and 2 are perspective views of three and four wheeled vehicles, respectively, supporting frame attached rearwardly mounted load bars.

FIG. 3 is a combination view illustrating the interconnections of integrated equipment with the frame of a three or four wheeled all terrain vehicle;

FIG. 4 illustrates the detachably attachable adjustable elements supporting rear tilt wheels;

FIG. 5 is a side view illustrating a tiltable bucket integratably detachably attached to framework extending supports of a three or four wheeled all terrain vehicle; and FIG. 6 is a bottom view of a cargo box illustrating attachment features of the cargo box;

FIG. 7 illustrates a framework attachable to the frame of an all terrain vehicle;

FIG. 8 illustrates a variant structure for supporting the rearward tilt limiting wheels;

FIG. 9 is a partial cross-sectional view taken along lines 9—9, as shown in FIG. 8;

FIG. 10 is a partial cross-sectional view taken along lines 10—10, as shown in FIG. 8;

FIGS. 11 and 12 illustrate the attachment of a cargo carrier to the variant shown in FIG. 8;

FIG. 13 is a cross-sectional view taken along lines 13—13, as shown in FIG. 11; and FIG. 14 is a cross-sectional view taken along lines 14—14, as shown in FIG. 11.

Referring to FIGS. 1 and 2 there are shown representative three and four wheeled all terrain vehicles 10, 12 incorporating load bars 14, 16 extending from the framework of the respective vehicles. These load bars are adapted to receive and retain with quick disconnect fittings or pins frame elements of various equipment detachably attachable to the respective vehicle.

Three and four wheeled all terrain vehicles of the type illustrated in FIGS. 1 and 2 are primarily intended for recreational purposes. In pursuit thereof, they are driven over rough terrain and often in inhospitable and uninhabited areas. To ensure adequate fuel, provisions and first aid equipment for such excursions, a cargo or baggage compartment for transport of such items is preferable. Moreover, rearward tipping or tilting of the vehicle is a constant danger in hilly areas and severe injuries to the driver may result therefrom. To accommodate these needs of a user of vehicles 10 or 12 supports for detachably attaching a cargo box and a set of rearward tilt limiting wheels are provided. Furthermore, the vehicles can be used to transport cargo of various types and detachably attachable equipment for such purposes are provided.

Integrated support and frame elements for detachably attaching a variety of equipment to a load bar of a three or four wheeled all terrain vehicle will be described with primary reference to FIG. 3. A pair of tubular members 18, 20 extend rearwardly from robust attachment points on the frame of vehicle 10; it is to be noted that vehicles 10 and 12 are, with respect to the invention described herein, interchangeably referenceable. Sections of sleeves 22, 24 are welded or otherwise secured perpendicular to members 18, 20, respectively. A load bar 26, which is equivalent to load bars 14, 16 shown in FIGS. 1 and 2, is penetrably located within each of sleeves 22, 24. The lock bar is retained in place by lock pins 28, 30 extending through a plurality of aligned apertures 32 in sleeve 22 and member 18 and aligned apertures 34 in sleeve 24 and member 20 and the respective ones of opposed apertures 36 in the top and bottom surface of the load bar. With such arrangement, the load bar may be centered with respect to the vehicle or extend to a greater degree towards the left or right sides thereof. Moreover, the load bar is essentially rigidly secured to the frame of vehicle 10 or 12 by means of the lock pins locking the load bar to each of the two sleeve and member assemblies.

For extended trips on either of vehicles 10 or 12, physical endurance of the driver will be greatly enhanced with use of a back rest. An adjustable back rest 40 may be mounted upon load bar 26 to provide such physical comfort. The back rest includes a cushion 42 secured to one end of member 44. The member is slidably positionable within seleve 46 and retained in place therein by pin 48 penetrably engaging both the sleeve and selected ones of apertures 50 in member 44. Sleeve 46 is attached to the upper extremity of upright member 52 and the latter extends from a sleeve 54. Sleeve 54 is capable of penetrably receiving load bar 26 to permit slidable positioning of the sleeve therealong. The sleeve, and hence back rest 40, is positionally retained along the load bar by means of a pin 56 penetrably engageable with opposed apertures 58 in the sleeve and one pair of opposed apertures 38 in the load bar. It may be noted that the interconnection between member 44 and sleeve 46 permits fore and aft adjustment of back rest 42, as indicated by the arrows in FIG. 3.

For purposes of recreation or utilitarian reasons for using one of vehicles 10, 12, it may be necessary to attach a trailer for hauling cargo. Referring to FIG. 3, there is shown trailer hitch apparatus 60 for attaching the ball of a trailer hitch to load bar 26. A sleeve 62 for penetrably receiving the load bar supports a further sleeve 64 of tubing. Sleeve 62 is located in place along the load bar by means of a pin 66 penetrably engaging opposed apertures 68 of the sleeve and a commensurate pair of apertures 36 in the load bar. Sleeve 64 is configured to penetrably receive vertically locatable L-member 70. The vertical location of the L-member is maintained by a pin 72 penetrably engaging opposed apertures in sleeve 64 and a pair of opposed apertures 74 in the vertical leg of the L-member. The horizontal leg of the L-member supports a sleeve 76 and is positionally retained by pins 78, 80 engaging opposed apertures 82, 84 of the sleeve and commensurate ones of an opposed pair of apertures 86 in the horizontal leg. A conventional ball 88 of a trailer hitch may be welded or otherwise secured to the upper surface of sleeve 76.

With such arrangement, the vertical location of ball 88 may be adjusted to accommodate requirements attendant the unit being trailered. Moreover, the fore and aft location of the ball may be adjusted to ensure sufficient clearance between the tongue of the unit being trailered and the vehicle.

Referring jointly to FIGS. 3 and 4, the structure for detachably attaching a pair of rearwardly located auxiliary wheels will be described. Wheels 100, 102 extend from the respective lower ends of legs 104, 106. Through experimentation it has been found advantageous from a stability stand point to displace the wheels rearwardly of the rear end of vehicle 10, 12. Accordingly, legs 104, 106 include a rearwardly extending slanted leg section 108, 110 depending from an upright leg section 112, 114, respectively. Sleeves 116, 118 are rigidly secured to upwardly angled stanchions 120, 122, extending from further sleeves 124, 126, respectively. Each upright leg section 112, 114 includes a plurality of paired apertures 128. Similar apertures 130 in sleeves 116, 118 permit vertical positioning and retention of legs 104, 106 with respect to the respective sleeves by penetrable engagement of pins 132, 134 with the respective apertures. Each of sleeves 124, 126 includes paired apertures 136 to penetrably receive pins 138, 140 extending therethrough and through opposed apertures 36 in load bar 26.

The degree of downward extension of legs 104, 106 with respect to load bar 26 controls and delimits the rearward tilt angle of the vehicle. As the vertical adjustment is rapid and facile, changes in the permissible tilt angle are readily effected to comport with the terrain traversed. Moreover, the tilt angle permissible may be considered as a function of the degree of risk a rider is willing to undertake. It may be further pointed out that in the event of a flat tire, wheels 100 and 102 may be lowered sufficiently to serve as load bearing wheels and prevent collapse and ultimate destruction of a punctured tire. Thus, wheels 100 and 102 serve in the capacity of a safety feature to permit travel of the vehicle even after a tire has been punctured.

Moreover, steering of vehicles 10, 12 upon a smooth hard surface is usually difficult due to the type of differential unit used which does not permit unequal rotational speed of the rear wheels during turns. By partially supporting the weight of the vehicle with wheels 100, 102, the load borne by the rear wheels is reduced resulting in reduced traction and a lowered resistance to turning.

By inspection of the structure illustrated in FIGS. 3 and 4, it will become evident that the lateral displacement between wheels 100, 102 may be varied to accommodate terrain and load bearing considerations.

As shown in FIG. 3, the wheels may be mounted upon an axel 142 extending from the terminal end of each slanted leg. Alternatively, as illustrated in FIG. 4, each wheel supporting axel 144 may be secured to a sleeve 146 by a retaining element 148, which sleeve is slidably positionable along the slanted leg. The location of the sleeve is determined by a pin 150 penetrably engaging a pair of apertures in the sleeve and one of pairs of apertures 152 in the slanted leg.

Referring to FIG. 5, there is illustrated apparatus for mounting a bucket 160 for conveying a load or for mounting a cargo box 162 (see FIG. 6). Each of a pair of L-shaped brackets 164 includes a vertical leg 166 and a horizontal leg 168. Each vertical leg has flanges 170, 172 extending forwardly therefrom. One L-shaped bracket 164 is removeably attachable to each of legs 104, 106 by means of pins 174 extending through flanges 170, 172 into pairs of opposed apertures 128 in the upright legs. Bucket 160 is secured to horizontal leg 168 by a sleeve 176 removeably secured through pin 178 engaging pairs of opposed apertures 180. The interconnection between sleeve 176 and the bucket may be a pivot mechanism 182 to permit tilting of the bucket about the axis of the pivot mechanism. The forward end of the bucket is secured to horizontal leg 168 through an inverted U-shaped member 184 configured to receive the horizontal leg and to be secured thereto through a pin 186. The U-shaped member may be attached directly to bucket 160 or through an intermediate stud 188, depending upon the configuration of the bottom of the bucket.

As illustrated in FIG. 5 by the dashed lines, disengagement of pins 186 from the respective U-shaped members 184, permits upward and rearward tilting of the bucket to empty it or for other purposes.

For various reasons it may be preferable to attach a closed cargo box or a cargo of a particular size or configuration to match the load to be trailered. Such a cargo box 162 is illustrated in FIG. 6. The cargo box is attachable to L-shaped brackets 164 by slidingly engaging horizontal legs 168 with sleeves 190, 192 located on the bottom surface of the cargo box. Each of these sleeves includes a plurality of paired apertures 194 to permit insertion of pins through the apertures of sleeves 190, 192 and the respective one of horizontal legs 168. It may be appreciated that the fore and aft position of the cargo box is readily adjustable to accomodate demand made thereupon.

Framework 200 is attachable to the frame of an all terrain vehicle and extends rearwardly therefrom. In the embodiment illustrated, a pair of plates 202 are attachable to differential 204 of the all terrain vehicle by nut and bolt means 206, which nut and bolt means are normally used to secure elements of the differential housing to one another. To render more rigid the attachment of framework 200 to the frame of the all terrain vehicle, rigid rods 208, 210 extend from longerons 205, 207 of the framework to ears 212, 214 of differential 204 for interconnection with frame elements 216, 218 of the all terrain vehicle.

Referring jointly to FIGS. 7 and 8, further details of the variant will be described. A pair of vertically oriented sleeves 220, 222 are rigidly attached to upright members 223, 225 of framework 200. Stanchions 224, 226 are slidably engageable with upright 220, 222, respectively. The stanchions are positionally located with respective to the sleeves by pins 228, 230 penetrably engaging apertures 232 and 234 located in sleeves 220, 222, respectively, and selected ones of apertures 233, 235 in the stanchions.

As illustrated in FIGS. 8 and 9, wheels 236, 238 are rotatively mounted on a common axis of axle assembly 240. Wheel 236 is mounted upon spindle 242, which spindle is welded or otherwise secured to a shaft 244. The shaft is welded or otherwise secured to coupling 246. Spindle 248 supports wheel 238 and is welded or otherwise secured to shaft 250. Shaft 250 extends into coupling 246 but is not rigidly secured thereto for reasons discussed below. Stanchion 224 is secured to shaft 244 by weld 252. Similarly, stanchion 226 is secured to shaft 250 by weld 254.

Raising and lowering axle assembly 240 results in rectilinear translation of stanchions 224, 226 within sleeves 220, 222. Through abuse or damage, parallelism between stanchions 224, 226 and sleeves 220, 222 may result. Any such lack of parallelism would render difficult the raising or lowering of axle assembly 240 in the event slight lateral displacement of the stanchions were not possible. The lack of rigid interconnection between shaft 250 and coupling 246 accommodates such displacement by permitting stanchion 226 to be repositioned laterally in conformance with the dictates of the stanchions.

To assist in raising and lowering axle assembly 240 and wheels 236, 238 mounted thereon, a conventional jack 256 may be employed, as illustrated in FIGS. 7, 8 and 9. Body 258 of the jack may be secured to cross members 260, 262 of framework 200. The extendable foot 264 of the jack is welded to coupling 246. On rotation of crank 266, foot 264 will be raised or lowered and result in commensurate movement of axle assembly 240 with respect to framework 200 and the all terrain vehicle.

It is to be understood that the jack may be replaced by an hydraulic jack if a source of hydraulic fluid under pressure is available.

To permit transport of a trailer behind the all terrain vehicle, the ball 270 of a conventional trailer hitch may be welded or otherwise secured to coupling 246. Necessarily, some positional accommodation must be made to prevent interference between the tongue mounted cup of the trailer hitch with foot 264 of jack 256.

Referring jointly to FIGS. 11, 12, 13 and 14, the method for attaching the pair of supporting brackets for a cargo box or bucket will be described. For convenience, only one of the brackets will be described, it is understood that the other bracket is a duplicate thereof. Brackets 164, supporting bucket 160 through U-shaped member 184, includes a collar 268 and a U-shaped bracket 270 secured to and extending forwardly of vertical leg 166. The collar penetrably receives the upper end of stanchion 224 above sleeve 220. U-shaped bracket 270 is located along the lower end of stanchion 224 to permit mating of its aperture 272 with one of the plurality of apertures 235 in the stanchion.

As particularly illustrated in FIG. 12, the distance between collar 268 and U-shaped bracket 270 must be greater than the length of sleeve 220; however, the amount of additional space therebetween is primarily a function of the amount of vertical adjustment with respect to sleeve 220 which is to be accommodated by L-shaped brackets 164. It is to be noted that the vertical position of L-shaped brackets 164, and hence the bucket or cargo box being supported, is a function of both the downward extension of axle assembly 240 as well as the position of L-shaped brackets 164 along the pair of stanchions.

From the above description of the various equipment rapidly detachably attachable to either of vehicles 10, 12 adjustably over a wide range is possible with respect to each and every piece of equipment and attachment/detachment may be made rapidly and with ease. By employing pins, rather than nuts and bolts, tools for attachment/detachment are unnecessary. Moreover, if pins of the type having spring loaded locking balls are employed, inadvertent extraction of the pins is precluded. Lock pins having a passageway at the extremity thereof for receiving cotter pins or other wire locking elements are contemplated.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. Convertible load carrying apparatus for attachment to the frame of an all terrain vehicle, said apparatus comprising in combination:
    (a) support means extending from the frame of the vehicle;
    (b) a load bar;
    (c) means for detachably mounting said load bar upon said support means;
    (d) load associated means, said load associated means being uniquely configured to comport with the load to be attached to the vehicle, said load associated means comprising a pair of legs and a rotatably mounted wheel located at the lower end of each of said pair of legs, a first stanchion for interconnecting one of said legs with said load bar and including a first sleeve for penetrably receiving said load bar and a second sleeve for penetrably engaging said one leg, a second stanchion for interconnecting one of said pair of legs with said load bar and including a third sleeve for penetrably receiving said load bar and a fourth sleeve for penetrably engaging said other leg and means for adjustably locating said first and third sleeves along said load bar and further means for adjustably locating said one and said other legs relative to said second and third sleeves, respectively; and
    (e) means for detachably attaching said load associated means with said load bar.

2. The apparatus as set forth in claim 1 wherein each of said one and said other legs includes an upright leg for engaging the respective one of said second and fourth sleeves and a rearwardly slanted leg for supporting said mounted wheel.

3. The apparatus as set forth in claim 2 wherein each of said first and second stanchions slopes rearwardly upwardly from the respective one of said first and third sleeves.

4. The apparatus as set forth in claim 3 wherein said locating means and said further locating means includes pin means.

5. The apparatus as set forth in claim 1 including a first L-shaped bracket for detachable attachment with said first leg and a second L-shaped bracket for detachable attachment with said second leg.

6. The apparatus as set forth in claim 5 including means for detachably securing said first L-shaped bracket with said first leg and further means for detachably securing said second L-shaped bracket with said second leg.

7. The apparatus as set forth in claim 6 wherein each of said securing means and said further securing means comprises at least one flange extending from the respective one of said first and second L-shaped brackets and pin means for securing each of said flanges to the respective one of said first and second legs.

8. The apparatus as set forth in claim 5 further including load carrying means detachably attachable to and supported by said first and second L-shaped brackets.

9. The apparatus as set forth in claim 8 wherein said load carrying means comprises a bucket and including means for pivotally securing said bucket to said L-shaped brackets and means for selectively locking said bucket to said L-shaped brackets to prevent pivotal movement of said bucket about said pivotally securing means.

10. The apparatus as set forth in claim 8 wherein said load carrying means comprises a box and including means associated with said box for slidingly engaging said L-shaped brackets and means for locking said slidingly engaging means with said L-shaped brackets.

11. Convertible load carrying apparatus for attachment to the frame of an all terrain vehicle, said apparatus comprising in combination:
    (a) support means extending from the frame of the vehicle;
    (b) a load bar;
    (c) means for detachably mounting said load bar upon said support means;
    (d) load associated means, said load associated means being uniquely configured to comport with the load to be attached to the vehicle, said load associated means including a back rest for accomodating a load imposed by an operator of the vehicle and including a sleeve for penetrably receiving said load bar and pin means for locating said sleeve along said load bar; and
    (e) means for detachably attaching said load associated means with said load bar.

12. The apparatus as set forth in claim 11 further including a member extending from said back rest, a further sleeve for penetrably receiving said member, pin means for locating said further sleeve along said member and means for securing said further sleeve to said sleeve, whereby said back rest is selectively positionable with respect to the load bar.

13. Apparatus for attachment to the frame of an all terrain vehicle, said apparatus comprising in combination:
(a) a framework attached to and extending from the frame of the vehicle;
(b) a pair of vertically oriented sleeves secured to said framework in a laterally displaced relationship to another;
(c) an axle assembly for supporting a pair of wheels;
(d) a pair of stanchions extending upwardly from said axle assembly for penetrable engagement with said pair of stanchions;
(e) a pair of L-shaped brackets for supporting a load, one L-shaped bracket of said pair of L-shaped brackets being attachable to one stanchion of said pair of stanchions and the other L-shaped bracket of said pair of L-shaped brackets being attachable to the other stanchion of said pair of stanchions; and
(f) means for selectively securing said stanchions with said sleeves to locate the wheels in a predetermined vertical relationship with the vehicle.

14. The apparatus as set forth in claim 13 wherein each L-shaped bracket of said pair of L-shaped brackets includes a collar for penetrably receiving the upper end of the respective one of said pair of stanchions and a U-shaped bracket for receiving the lower end of the respective one of said pair of stanchions.

15. The apparatus as set forth in claim 14 including means for securing said U-shaped bracket of each L-shaped bracket to the respective one of said pair of stanchions.

16. The apparatus as set forth in claim 13 including a bucket for carrying a load and means for securing said bucket to said pair of L-shaped brackets.

17. The apparatus as set forth in claim 16 wherein said securing means includes means for tilting said bucket with respect to said L-shaped brackets.

18. The apparatus as set forth in claim 16 wherein said axle assembly includes a coupling, a first wheel supporting spindle axially fixed with respect to said coupling and a second wheel supporting spindle axially repositionable with respect to said coupling.

19. The apparatus as set forth in claim 16 including means for vertically repositioning said axle assembly with respect to said framework.

20. The apparatus as set forth in claim 13 including a cargo box for carrying a load and means for securing said cargo box to said pair of L-shaped brackets.

21. The apparatus as set forth in claim 20 wherein said axle assembly includes a coupling, a first wheel supporting spindle axially fixed with respect to said coupling and a second wheel supporting spindle axially repositionable with respect to said coupling.

22. The apparatus as set forth in claim 20 including means for vertically repositioning said axle assembly with respect to said framework.

* * * * *